(12) United States Patent
Scheurer et al.

(10) Patent No.: US 9,144,902 B2
(45) Date of Patent: Sep. 29, 2015

(54) METHOD FOR DETERMINING POSSIBLE POSITIONS OF A ROBOT ARM

(71) Applicant: KUKA Laboratories GmbH, Augsburg (DE)

(72) Inventors: Christian Scheurer, Augsburg (DE); Uwe E. Zimmermann, Augsburg (DE); Shashank Sharma, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 168 days.

(21) Appl. No.: 13/865,665

(22) Filed: Apr. 18, 2013

(65) Prior Publication Data

US 2013/0310982 A1 Nov. 21, 2013

(30) Foreign Application Priority Data

May 15, 2012 (DE) .......................... 10 2012 208 094

(51) Int. Cl.
*B25J 9/16* (2006.01)
*B25J 5/00* (2006.01)

(52) U.S. Cl.
CPC .. *B25J 9/162* (2013.01); *B25J 5/00* (2013.01); *B25J 5/007* (2013.01); *B25J 9/1664* (2013.01); *B25J 9/1666* (2013.01); *G05B 2219/39022* (2013.01); *G05B 2219/40298* (2013.01); *Y10S 901/01* (2013.01); *Y10S 901/15* (2013.01)

(58) Field of Classification Search
CPC .............. B25J 5/007; B25J 9/162; B25J 5/00; B25J 9/1664; B25J 9/1666; G05B 2219/40298; G05B 2219/39022
USPC ................. 700/247, 250, 251, 253, 262, 263; 901/1
See application file for complete search history.

(56) References Cited

U.S. PATENT DOCUMENTS

| 4,954,962 A * | 9/1990 | Evans et al. ..................... 701/28 |
| 5,413,454 A * | 5/1995 | Movsesian ..................... 414/729 |
| 5,550,953 A * | 8/1996 | Seraji ............................. 700/263 |
| 5,737,500 A * | 4/1998 | Seraji et al. .................... 700/251 |
| 8,571,706 B2 * | 10/2013 | Zhang et al. ................... 700/245 |
| 2006/0116973 A1* | 6/2006 | Okamoto et al. ............... 706/16 |
| 2007/0118250 A1* | 5/2007 | Nagamatsu .................... 700/251 |
| 2008/0316368 A1* | 12/2008 | Fritsch et al. ................. 348/722 |
| 2010/0152899 A1* | 6/2010 | Chang et al. ................... 700/262 |
| 2010/0155156 A1* | 6/2010 | Finkelstein .................. 180/54.1 |
| 2011/0224815 A1* | 9/2011 | Sonner et al. .................. 700/97 |
| 2012/0004774 A1* | 1/2012 | Umetsu ......................... 700/254 |

OTHER PUBLICATIONS

German Patent Office; Search Report in German Patent Application No. 10 2012 208 094.5 dated Jan. 15, 2013; 5 pages.
Zacharias et al.; Positioning Mobile Manipulators to Perform Constrained Linear Trajectories; published Sep. 2008; 7 pages.
Zacharias et al.; Capturing Robot Workplace Structure: Representing Robot Capabilities; published Oct. 2007; 8 pages.

* cited by examiner

Primary Examiner — Jason Holloway
(74) Attorney, Agent, or Firm — Wood, Herron & Evans, LLP

(57) ABSTRACT

The invention relates to a method for determining possible positions of a robot arm of a robot. The robot arm comprises a frame, numerous links, disposed successively, which can move in relation to one another, with respect to axes. First, a target position and target orientation in space for a robot arm or a tool center point assigned to an end effector attached to the robot arm, are defined, to which a reference coordinate system having polar coordinates is assigned. Subsequently, potential possible positions of the frame of the robot arm in space and in the polar coordinates of the reference coordinate system are determined on the basis of the geometry of the robot arm, such that the tool center point can assume the defined target position and target orientation.

9 Claims, 4 Drawing Sheets

METHOD FOR DETERMINING POSSIBLE POSITIONS OF A ROBOT ARM

TECHNICAL FIELD

The invention relates to a method for determining possible positions of a robot arm.

BACKGROUND

U.S. Pat. No. 5,550,953 discloses a mobile robot and a method for operating the mobile robot. The mobile robot comprises a robot arm having numerous links that can be moved in relation to one another and a transport vehicle, to which the robot arm is attached. The position of the robot arm as such can be altered by means of the transport vehicle.

SUMMARY

The objective of the invention is to provide an improved method for determining possible positions of a robot arm.

The objective of the invention is obtained by means of a method for determining possible positions of a robot arm on a robot, wherein the robot arm comprises a frame, numerous moveable links disposed successively that can move in relation to one another in terms of axes, and drives for moving the links, exhibiting the following method steps:

Definition of a target position and target orientation in space of a robot arm or tool center points assigned to an end effector attached to the robot arm, to which a reference coordinate system having polar coordinates is assigned, Determination of the potential possible positions of the frame of the robot arm in space and in the polar coordinates of the reference coordinate system, based on the geometry of the robot arm, such that the tool center point can assume the defined target position and the target orientation.

By means of the method according to the invention, possible installation locations, or installation positions, respectively, of the robot arm, for example, can be found, or scheduled, respectively, within, for example, a robot cell. For this, in accordance with the invention, the target position and the target orientation, i.e. the target location, or the target pose, respectively, of the tool center point of the robot arm or the end effector attached to the robot arm, is determined. Subsequently, the potential possible positions of the frame, such as the potential possible installation locations of the robot arm, are determined in polar coordinates for positions in the plane (2D), or spherical coordinates for positions in space (e.g. with 3-axis portals), respectively, of the reference coordinate system assigned to the tool center point.

The potential possible positions of the robot arm lie, in particular, within a sphere, the center of which is the tool center point in its target position. The polar coordinates are preferably spherical coordinates.

The target position and the target orientation of the tool center points can first be defined in terms of coordinates of the stationary global coordinate system.

As a rule, the robot arm cannot be placed at all potential possible positions. In accordance with one embodiment of the method according to the invention, said embodiment exhibits the following additional method step:

Determination of the possible positions of the frame of the robot arm based on the determined potential possible positions and on at least one boundary condition limiting the potential possible positions of the frame. The possible positions are then, e.g. the intersection of the interior of the sphere describing the potential possible positions with the at least one limiting boundary condition.

One boundary condition limiting the potential possible positions of the frame is, e.g. a possible surface onto which it is possible to attach the frame of the robot arm. The surface is, e.g. a base, for example, of a robot cell, onto which the robot arm, together with its frame, is to be attached.

The robot arm can also comprise at least one linear axis, by means of which the frame of the robot arm can be moved in a linear manner. The boundary condition limiting the potential possible positions of the frame is then obtained by means of the extent of the linear axis, or the extent of the linear axes, respectively. By this means, it is also possible, e.g., to more effectively schedule the positioning of the robot arm with a linear axis, e.g. in a robot cell. Numerous linear axes can be obtained, e.g. by means of a so-called portal, which is, e.g. attached to a ceiling. The robot arm is attached by means of its frame to the portal. By means of the portal, the frame of the robot arm, in particular, can be driven along the ceiling with respect to two linear axes. In addition, it can also be provided that the portal is designed in such a manner that the robot arm, with its frame, can also be raised and lowered along a linear axis oriented at a right angle to the ceiling.

The robot can also be designed as a mobile robot, with a mobile transport device having drives for moving the transport device, on which the robot arm, together with its frame, is attached. The boundary condition limiting the potential possible positions of the frame then represents, e.g. a possible position or location of the transport device.

The mobile transport device can, preferably, be designed as a transport vehicle with wheels, wherein the drives for the mobile transport vehicle are configured to move the wheels. The mobile robot according to the invention can also be designed as a humanoid robot, the mobile support device of which is designed in the form of robot legs.

With conventional mobile robots, the platform-specific kinematic redundancies of the overall system are resolved with the coordinates of the global coordinate system in the 2D plane.

The transport vehicle is preferably designed as a transport vehicle that can move in an omnidirectional manner (holonomic platform). Preferably, the wheels of the transport vehicle are therefore designed as omnidirectional wheels. One example of an omnidirectional wheel is the Mecanum wheel, known to the person skilled in the art. Because of the omnidirectional wheels, the mobile robot according to the invention, or its transport vehicle, respectively, is able to move freely in space. Thus, the transport vehicle can move not only forwards, backwards, or sideways, or in curves, but also, e.g., it can rotate about a vertical axis.

According to another variation of the method according to the invention, said method comprises, additionally, a determination of the potential possible positions of the frame in terms of coordinates of the stationary global coordinate system, based on the polar coordinates of the reference coordinate system.

Advantages of the method according to the invention may comprise the following: A targeted iteration via zero space solutions can be obtained, because solution intervals for redundancies can be returned.

One solution for the placement of a robot arm in a robot cell can be found by means of considering the task that is to be executed, i.e. the target position of the tool center points. Accordingly, a positioning or the transport vehicle, or the mobile transport device, respectively, can be obtained with mobile robots.

If applicable, a linear axis setting or portal setting can be given in an inverse kinematics as the minimal or maximal linear axis setting instead of the entire range of values of the linear axis/portal.

A determination of the interval limits for the redundancies in relation to the robot system can be facilitated.

Redundancies in this case refer to a local reference system, particularly the tool center point coordinate system, or in general, to a task oriented coordinate system.

BRIEF DESCRIPTION OF THE DRAWINGS

Embodiment examples of the invention are depicted in an exemplary manner in the attached schematic drawings. They show.

DETAILED DESCRIPTION

Figure 1:
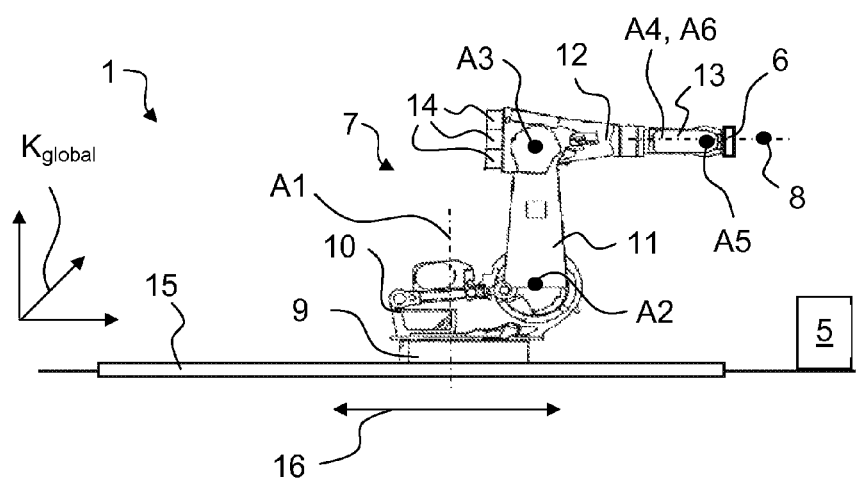
FIG. 1 a robot arm that can move by means of a linear axis, to which a tool center point is assigned, FIG. 2 a diagram for illustrating different positions of the robot arm for the same pose of its tool center points, FIG. 3 a mobile robot, comprising a transport vehicle and a robot arm attached to the transport vehicle, FIG. 4 an omnidirectional wheel, and FIG. 5 a diagram illustrating the determination of the location of the transport vehicle.

FIG. 1 shows a robot 1 that has a robot arm 7. The robot arm 7 comprises, in the present embodiment example, numerous successively disposed links, which are connected to one another by means of joints. The links comprise, in particular, a frame 9, by means of which the robot arm 7 is attached to the base body 3 of the vehicle.

The robot arm 7 exhibits, as another link, e.g. a carousel 10, supported, in particular, in relation to the frame 9, such that it can rotate about the vertical axis A1. Other links of the robot arm 7 are, in the case of the present embodiment example, a rocker 11, a cantilever 12, and a robot hand 13, preferably having multiple axes, having an attachment device 6, designed, e.g. as a flange, for the attachment of an end effector, or a tool, respectively, thereto. The rocker 11 is attached at its lower end to, e.g. a rocker bearing head, not shown in detail, on the carousel 10, such that it can pivot about a preferably horizontal axis A2. The cantilever 12, in turn, is rotatably mounted at the upper end of the rocker 11, such that it can rotate about the, likewise preferably, horizontal axis A3. This supports the robot hand 13, having, by way of example, its three axes of rotation (axes A4-A 6) at its end. The robot hand 13 can also, however, exhibit only two axes of rotation.

The robot arm 7 further comprises drives connected to a control device 5 of the robot 1. The drives are electric drives in the present embodiment example, which are, in particular, regulated electric drives. Only a few of the electric motors 14 of these electric drives are shown in FIG. 1.

In the case of the present embodiment example, the robot 1 comprises a longitudinal rail 15, disposed, e.g. on the floor, on which the robot arm 7, together with its frame 9, is supported such that it can be displaced horizontally in the direction of a double arrow 16. The longitudinal rail 15 thus represents a linear axis, along which the robot arm 7 can be displaced in the direction of the double arrow 16, controlled, in particular, by means of the control device 5 and by means of an additional, not shown in detail, drive. This drive is preferably an electric drive, in particular a regulated electric drive.

It is provided that in the operation of the robot 1, the control device 5 controls the drives in such a manner that the attachment device 6 or a so-called tool center point 8, assigned to the end effector attached to the attachment device 6, assumes a pre-defined target location, or a target pose, respectively, i.e. a target position and target orientation in space. For this, the robot arm 7 is moved along the longitudinal rail 15, controlled by means of the control device 5, in accordance with this target pose, to a position, and the axes A1-A6 of the robot arm 7 are moved into the corresponding axis positions, or angular positions $\theta 1$-$\theta 6$, respectively.

In the case of the present embodiment example, the robot 1 concerns a redundant robot, i.e. numerous axis positions, or angular positions $\theta 1$-$\theta 6$, respectively, of the robot arm 7, and numerous positions of the frame 9 of the robot arm 7, are potentially possible for one and the same pose of the tool center point 8. This is illustrated in FIG. 2.

Figure 2:
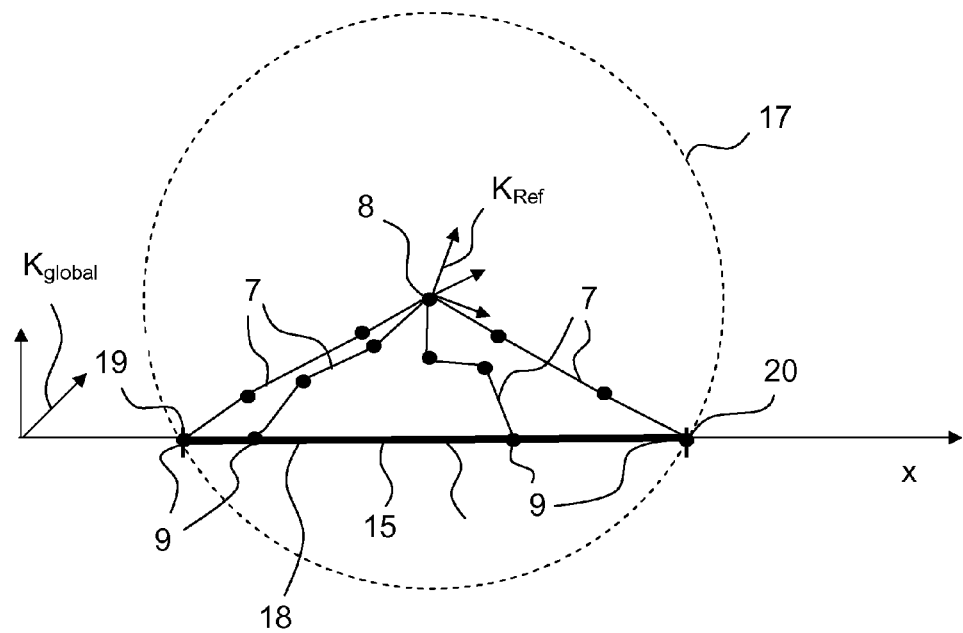

In the case of the present embodiment example, the tool center point 8 is assigned a coordinate system, i.e. a reference coordinate system $K_{Ref}$, which is shown in FIG. 2. The origin of the reference coordinate system $K_{Ref}$ lies, in particular, in the tool center point 8.

In the case of the present embodiment example, a region is then determined, in which the robot arm 7, or its frame 9, respectively, can be theoretically positioned, based on the geometry of the robot arm 7, such that the tool center point 8 can be aligned in a target pose, i.e. a target position and target orientation. These potential possible positions of the frame 9 of the robot arm 7 are not, however, described in terms of coordinates of a stationary global coordinate system $K_{global}$, but instead, are first described in terms of polar coordinates of the reference coordinate system $K_{Ref}$.

In the case of the present embodiment example, the interior of a sphere 17, the center of which is the origin of the reference coordinate system $K_{Ref}$ for the target pose of the tool center point 8, is obtained for the region specified above, i.e. the potential possible positions.

In the case of the present embodiment example, the robot arm 7 can be moved in a linear manner by means of the longitudinal rail 15. For this reason, the frame 9 of the robot arm cannot be positioned within the entire sphere 17, but only within a redundancy region 18 thereof, the length of which corresponds to the course along which the robot arm 7 can be displace in the longitudinal direction by means of the longitudinal rail 15. The potential possible positions of the frame 9 are limited on the basis of the linear axis assigned to the longitudinal rail 15, in reference to which the robot arm 7, together with its frame 9, can be displaced along the double arrow 16. The longitudinal rail 15 thus forms a boundary condition limiting the potential possible positions of the frame 9.

If, for example, the linear axis, or the longitudinal rail 15, respectively, is oriented in the direction of the x-components of the global coordinate system $K_{global}$, i.e. the frame can be displaced in the direction of the x-components of the global coordinate system $K_{global}$, then a redundancy value range 18, having a minimal redundancy value 19, and a maximal redundancy value 20 is obtained, between which the robot arm 7 can be displaced, and the axis positions, or the angular positions $\theta 1$-$\theta 6$, respectively, can be adjusted such that the tool center position 8 can assume the target pose.

Redundancy values that can be assumed by the robot arm 7, or its frame 9, respectively, are obtained, in particular, by means of a section of the linear axis assigned to the linear rail 15, through the sphere 17. If a placement of the longitudinal rail 15 is also to be obtained on the floor, then the section of the sphere 17, in conjunction with the floor, results in a circular area on the floor.

Prior to the section with the sphere 17, this is preferably converted to coordinates of the global coordinate system $K_{global}$.

In the case of the present embodiment, the robot arm exhibits six axes A1-A6. Accordingly, up to eight different possibilities (statuses) for reaching a tool center point 8 position are obtained. These do not, however, describe a continuous, coherent zero space.

With the linear axis assigned to the longitudinal rail 15, the entire robot 1 obtains one additional degree of freedom, i.e. one additional redundancy, with which a zero space movement is possible. Thus, an additional kinematic redundancy results, which is also continuous and coherent, and is additionally limited to the redundancy value range 18 (minimal redundancy value 19 and maximal redundancy value 20). For this, the minimal and maximal redundancy values 19, 20 lie within the valid limits of the entire linear axis. To the extent that no axis limits are considered, a solution for the analytically formulated inverse kinematic exists for the entire redundancy value range 18.

Numerous linear axes can also be provided, which are obtained, e.g. in the form of a so-called portal, or a gantry, respectively. The portal is attached, e.g., to a ceiling. The robot arm 7 is attached to the portal by means of its frame 9. The frame 9 of the robot arm 7 can be driven along the ceiling with respect to two linear axes by means of the portal. In addition, it can also be provided that the portal is designed such that the robot arm 7, together with its frame 9, can also be raised and lowered along a linear axis oriented at a right angle to the ceiling.

The method described can also be applied in order to determine the region in which the frame 9 of the robot arm 7 can be positioned such that the tool center point 8 can assume the target pose. The possible region, e.g. the floor, on which the frame 9 can be positioned thus represents the boundary condition limiting the potential possible positions of the frame 9.

Figure 3:
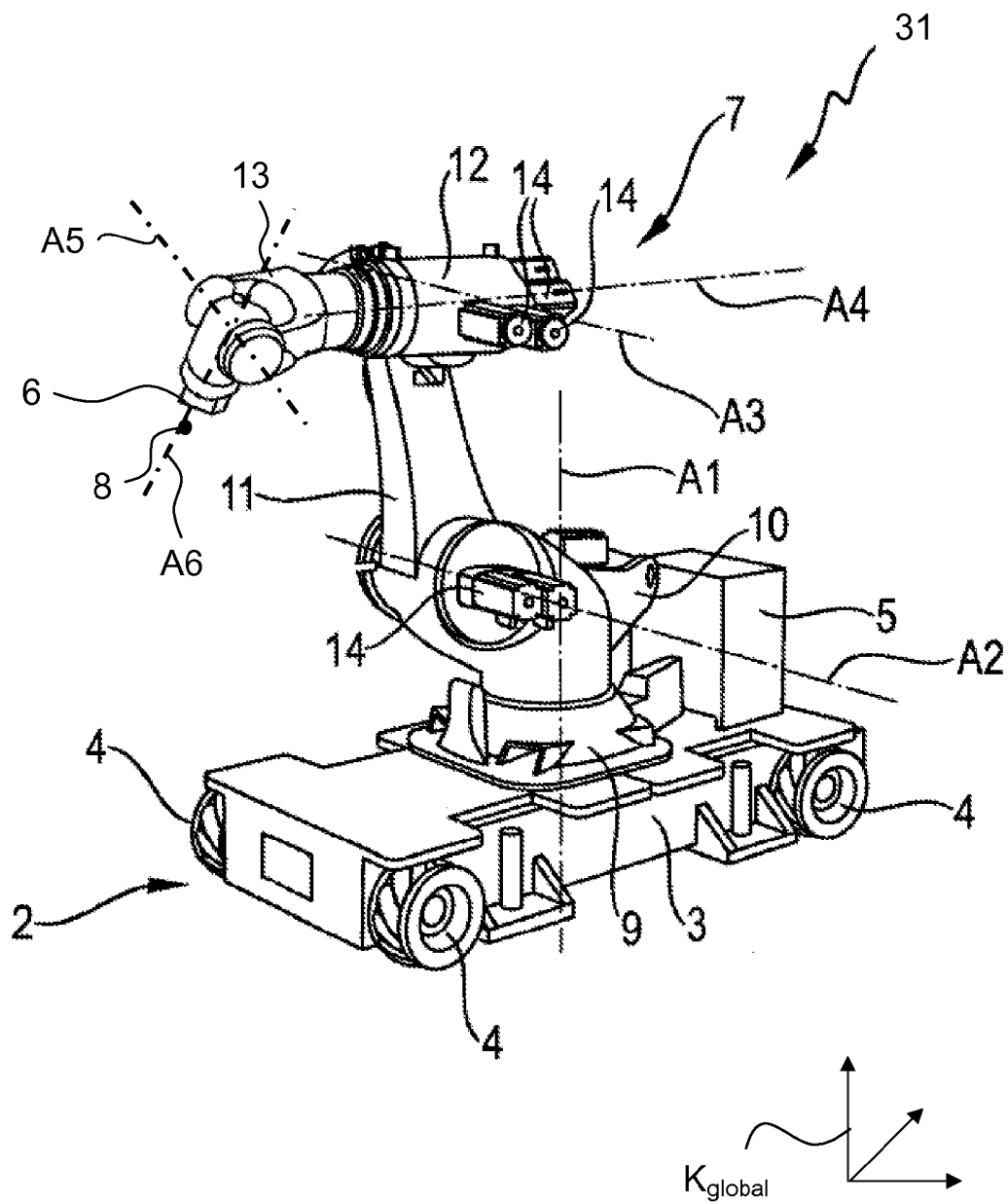

FIG. 3 shows another robot 31. If not described otherwise, the components of the robot 31 shown in FIG. 3 having substantially the same structure and function as the components of the robot 1 shown in FIG. 1, are provided with the same reference symbols.

The robot 31 shown in FIG. 3 is substantially distinguished from the robot 1 shown in FIG. 1 in that the robot 31 depicted in FIG. 3 does not exhibit a longitudinal rail 15. Thus, the robot 31 shown in FIG. 3 is designed as a mobile robot 31, which, in the case of the present embodiment example, exhibits a transport vehicle 2 that can be moved in an omnidirectional manner. This comprises, e.g. a vehicle base body 3 and numerous wheels 4, rotatably disposed on the vehicle base body 3, which are designed, in particular, as omnidirectional wheels. In the case of the present embodiment example, the transport vehicle 2 has four omnidirectional wheels 4. At least one of the wheels 4, and preferably all of the wheels 4 are powered by means of one or more drives. The drives, not shown in greater detail, are preferably electric drives, in particular, are regulated electric drives, and are connected to the control device 5, disposed, for example, in or on the vehicle base body 3, which is equipped for moving the transport vehicle 2 by means of the appropriate control of the drives for the wheels 4.

Figure 4:
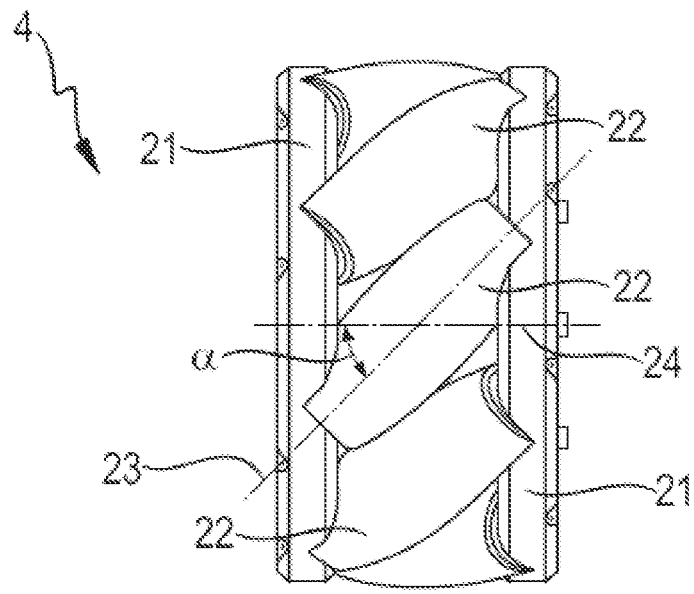
Figure 5:
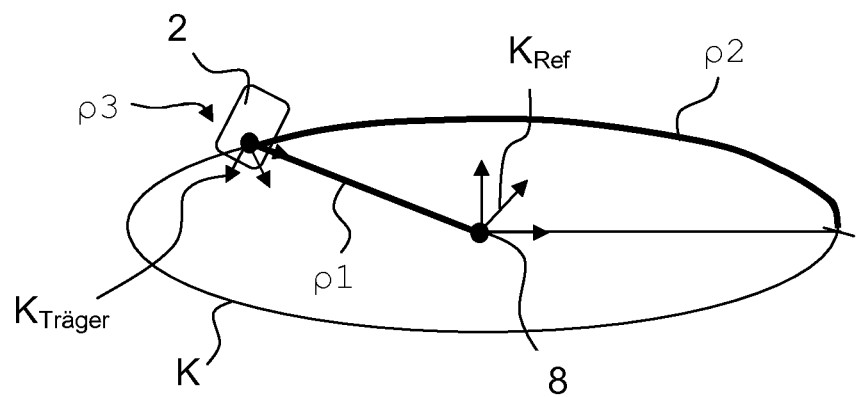

One example of an omnidirectional wheel is the so-called Mecanum wheel. A wheel 4, designed as an omnidirectional wheel, of the mobile robot 1, or its transport vehicle 2, respectively, is shown in FIG. 4 in a front view.

The wheel 4 designed as an omnidirectional, or Mecanum, wheel exhibits, in the case of the present embodiment example, two wheel disks 21, rigidly connected to one another, between which numerous rollers 22 are supported, which can rotate with respect to their longitudinal axes 23. The two wheel disks 21 can be supported such that they can rotate with respect to a rotational axis 24, and are powered by means of one of the drives in the transport vehicle 2 in such a manner that the two wheel disks 21 rotate with respect to the rotational axis 24.

In the case of the present embodiment example the rollers 22 are spaced evenly with respect to one another, and supported on the wheel disks 21 such that their roller surfaces extend beyond the circumference of the wheel disks 21. Furthermore, the rollers 22 are supported on the wheel disks 21 such that their longitudinal axes 23 form an angle α to the rotational axis 24 of, for example, 45°.

Because of the omnidirectional wheels 4, it is possible for the mobile robot 31, or its transport vehicle 2, respectively, to move freely in space. Thus, the transport vehicle 2 can move not only forwards, backwards, or sideways, or it can drive through curves, but it can also rotate the robot arm about an arbitrary vertical axis, e.g. about the axis A1.

The mobile robot 31 further comprises a robot arm 7, which is attached, in particular, to the transport vehicle 2, or its vehicle base body 3, respectively. Because of the omnidirectional wheels 4, the transport vehicle 2 thus, in the case of the present embodiment example, represents a holonomic platform for the robot arm 7. The transport vehicle 2 can also, however, be designed as a non-holonomic platform for the robot arm 7. The transport vehicle 2 thus represents a mobile support device, to which the robot arm 7 is attached. If the mobile robot is designed, e.g. as a humanoid or insect-like robot, then this support device can, for example, also be designed in the form of numerous robot legs, by mean of which the robot can move.

In the operation of the mobile robot 31, it is provided that the control device 5 controls the drives for the robot arm 7 and the wheels 4 in such a manner that the attachment device 6, or the tool center point 8, respectively, assumes a given target location, or target pose, respectively, i.e. it assumes a target position and target orientation in space. For this, the transport vehicle 2, controlled by means of the control device 5, is brought into a position corresponding to this target pose, and aligned in an orientation in space, and the axes A1-A6 of the robot arm 7 are brought into a corresponding axis position, or angular position θ1-θ6, respectively.

In the case of the present embodiment example, a region is obtained, in which the robot arm 7 can theoretically be positioned based on its geometry, such that the tool center point 8 can assume the target pose, which is within the sphere 17, the center of which is the origin for the reference coordinate system $K_{Ref}$ for the target pose of the tool center point 8.

In the case of the present embodiment example, the robot arm 7 can be moved by means of the transport vehicle 2. For this reason, the frame 9 of the robot arm 7 cannot be positioned inside of the entire sphere 17, but instead, can only be positioned within a redundancy value region, which is determined by means of a section drawn through the sphere 17 by means of a plane, i.e. the floor, on which the transport vehicle moves. As a result, a circular area on the floor is obtained as the possible redundancy value region.

In the case of the present embodiment example, the possible locations of the transport vehicle 2, i.e. its positions and orientations that can be assumed by the transport vehicle 2 in order that the tool center point 8 assumes its target pose, can also be expressed in terms of the polar coordinates $\rho 1$, $\rho 2$ of the reference coordinate system $K_{Ref}$.

Thus, a 3-tuple ($\rho 1$, $\rho 2$, $\rho 3$) can be determined, which describes the possible locations of the transport vehicle 2 by means of the polar coordinates $\rho 1$, $\rho 2$ in the local reference coordinate system $K_{Ref}$.

Thus, the polar coordinates $\rho 1$, $\rho 2$ describe the position with respect to the reference coordinate system $K_{Ref}$ in two-dimensional polar coordinates and, additionally, the rotation $\rho 3$ of the transport vehicle 2.

Therefore, the polar coordinate $\rho 1$ describes the distance of the transport vehicle 2 from the origin of the reference coordinate system $K_{Ref}$, the polar coordinate $\rho 2$ describes the direction of travel for the transport vehicle 2 on a distance circle K having the radius $\rho 1$, and the rotation $\rho 3$ describes the orientation of the transport vehicle 2 with respect to the reference coordinate system $K_{Ref}$. The origin of a transport vehicle coordinate system $K_{Träger}$ preferably lies in the origin of a coordinate system assigned to the robot arm 7, such that, preferably, a rotational axis of the transport vehicle 2 coincides with the axis A1 of the robot arm 7, with respect to which the carousel 10 can rotate in relation to the frame 9.

Figure 6:
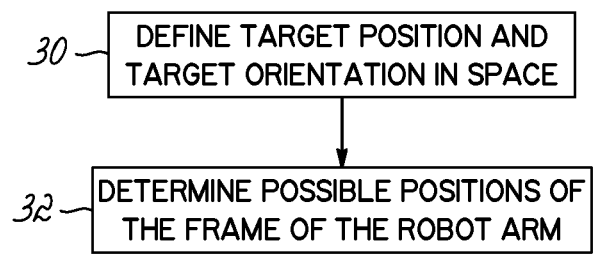
FIG. 6 is a flowchart illustrating an exemplary method for determining possible positions of a robot arm.

FIG. 6 is a flowchart illustrating an exemplary method for determining possible positions of a robot arm of a robot in accordance with the present disclosure. In a first step 30, a target position and target orientation of a robot arm or a tool center point assigned to a robot arm or to an end effector attached to the robot arm is defined. In a second step 31, possible positions of a frame of the robot arm are determined based on the geometry of the robot arm so that the tool center point can assume the defined target position and orientation, as described in detail above.

What is claimed is:

1. A method for determining possible positions of a robot arm of a robot, wherein the robot arm comprises a frame, a plurality of successively arranged links that can move in relation to one another with respect to axes, and drives for moving the links, the method comprising:

defining a target position and target orientation in space of a robot arm or a tool center point assigned to the robot arm or an end effector attached to the robot arm, to which a reference coordinate system having polar coordinates is assigned;

determining with a computer potential possible positions of the frame of the robot arm in space and in the polar coordinates of the reference coordinate system, based on the geometry of the robot arm, such that the tool center point can assume the defined target position and target orientation; and locating the frame at one of the determined positions;

wherein the robot is a mobile robot; and a first polar coordinate defines the distance of the mobile robot from the origin of the reference coordinate system, a second polar coordinate defines a direction of travel of the mobile robot, and a third polar coordinate defines an orientation of the mobile robot with respect to the reference coordinate system.

2. The method according to claim 1, further comprising defining the target position and target orientation of the tool center point in the coordinates of a stationary global coordinate system.

3. The method according to claim 1, wherein the potential possible positions lie within a sphere, the center of which is the tool center point in its target position.

4. The method according to claim 1, further comprising:

determining the possible positions of the frame of the robot arm based on the determined potential possible positions and on at least one boundary condition, which limits the potential possible positions of the frame.

5. The method according to claim 4, wherein the at least one boundary condition limiting the potential possible positions of the frame is a surface, onto which the frame of the robot arm may be attached.

6. The method according to claim 4, wherein the robot comprises at least one linear axis, by means of which the frame of the robot arm can be moved linearly, such that the boundary condition limiting the potential possible positions of frame is determined through the extension, or extensions, respectively, of the at least one linear axis.

7. The method according to claim 4, wherein the robot includes a mobile support device having drives for moving said support device, to which the robot arm, together with its frame, is attached, and wherein the boundary condition limiting the potential possible positions of the frame represents a possible position or location of the support device.

8. The method according to claim 7, wherein the mobile support device is configured as a transport vehicle having wheels, and the drives for the mobile support device are configured for moving the wheels.

9. The method according to claim 1, further comprising determining the potential possible positions of the frame in terms of coordinates of a stationary global coordinate system, based on the polar coordinates of the reference coordinate system.

\* \* \* \* \*